(12) United States Patent
Burke

(10) Patent No.: US 10,870,514 B2
(45) Date of Patent: Dec. 22, 2020

(54) FREE-STANDING MODULAR FRAME AND LINER FOR HOLDING LIQUID IN A SHIPPING CONTAINER

(71) Applicant: Integrated Treatment Systems, LLC, Ankeny, IA (US)

(72) Inventor: Aaron Burke, Ankeny, IA (US)

(73) Assignee: Integrated Treatment Systems, LLC, Ankeny, IA (US)

( * ) Notice: Subject to any disclaimer, the term of this patent is extended or adjusted under 35 U.S.C. 154(b) by 293 days.

(21) Appl. No.: 15/857,913

(22) Filed: Dec. 29, 2017

(65) Prior Publication Data

US 2019/0202600 A1 Jul. 4, 2019

(51) Int. Cl.
| | |
|---|---|
| *B65D 21/08* | (2006.01) |
| *B65D 81/38* | (2006.01) |
| *B65D 25/14* | (2006.01) |
| *B65D 88/12* | (2006.01) |
| *C02F 9/00* | (2006.01) |

(52) U.S. Cl.
CPC .......... *B65D 21/083* (2013.01); *B65D 25/14* (2013.01); *B65D 81/3816* (2013.01); *B65D 88/121* (2013.01); *C02F 9/00* (2013.01); *C02F 2201/007* (2013.01)

(58) Field of Classification Search
CPC .. B65D 21/083; B65D 25/14; B65D 81/3816; B65D 88/121; B65D 88/123
USPC .................................................. 220/1.5, 1.6
See application file for complete search history.

(56) References Cited

U.S. PATENT DOCUMENTS

| | | |
|---|---|---|
| 3,044,161 A | 7/1962 | Morrison |
| 3,115,982 A | 12/1963 | Morrison |
| 4,376,494 A | 3/1983 | Bjurling |
| 5,449,081 A | 9/1995 | Sjostedt et al. |
| 5,624,049 A | 4/1997 | Kovash et al. |
| 5,911,337 A | 6/1999 | Bedeker |

(Continued)

OTHER PUBLICATIONS

Mac Customs, image from website: www.maccustoms.com.au/Shipping-Containers-Homes.php, see image below text "Water Storage Shipping Containers", published at least as early as Dec. 28, 2017 (1 page).

(Continued)

*Primary Examiner* — Steven A. Reynolds
*Assistant Examiner* — Javier A Pagan
(74) *Attorney, Agent, or Firm* — Maginot, Moore & Beck LLP

(57) ABSTRACT

A system for treating wastewater includes an intermodal shipping container and a scalable, modular receptacle spaced apart from interior walls of the container. The receptacle includes a plurality of frame structures spaced apart from one another. The frame structures each include two elongate frame members that are spaced apart from one another and that extend in parallel. The receptacle further includes an insulation member supported between the frame members of adjacent frame structures. The insulation member defines an inner surface that is coplanar with inner surfaces of the frame members. The receptacle further includes an impermeable liner that is configured to hold a large volume of liquid. The liner has a liner wall that is positioned against the inner surface of the insulation member and the inner surfaces of the frame members to support the liner wall against a hydraulic load of the liquid.

17 Claims, 12 Drawing Sheets

(56) References Cited

U.S. PATENT DOCUMENTS

| | | | |
|---|---|---|---|
| 6,202,863 B1* | 3/2001 | Grenier | B65D 88/123 |
| | | | 211/70.4 |
| 6,308,850 B1 | 10/2001 | Coom et al. | |
| 6,977,038 B2 | 12/2005 | Jowett | |
| 7,288,192 B2 | 10/2007 | Jowett | |
| 7,943,051 B2 | 5/2011 | Dieziger | |
| 8,871,089 B2 | 10/2014 | Early et al. | |
| 2002/0033363 A1 | 3/2002 | Hasegawa | |
| 2006/0118504 A1* | 6/2006 | Willemsen | B65D 90/006 |
| | | | 211/189 |
| 2010/0025407 A1 | 2/2010 | Benson | |
| 2014/0001127 A1 | 1/2014 | Hymel et al. | |
| 2014/0224791 A1 | 8/2014 | Downey et al. | |
| 2014/0284339 A1* | 9/2014 | Downey | B65D 90/10 |
| | | | 220/565 |
| 2015/0048097 A1 | 2/2015 | Jeffries | |
| 2017/0057741 A1 | 3/2017 | Downey et al. | |

OTHER PUBLICATIONS

RODI Systems, image from website: www.rodisystems.com/rodi-projects.html, see image associated with text "Septic Service Company", published at least as early as Dec. 28, 2017 (1 page).

* cited by examiner

FREE-STANDING MODULAR FRAME AND LINER FOR HOLDING LIQUID IN A SHIPPING CONTAINER

FIELD

This application relates generally to the field of large receptacles for holding liquid and, more particularly, to a scalable, modular receptacle incorporated into an intermodal shipping container for use in a wastewater treatment system.

BACKGROUND

Decentralized wastewater treatment systems and industrial waste pretreatment systems (also known as "packages") are comprised of similar unit operations as larger centralized municipal wastewater treatment facilities except that the equipment and reactors are generally downscaled as compared to high-flow facilities. Additionally, these smaller systems are often pre-fabricated off-site, and the completed product is then shipped to a final installation location. As such, an intermodal shipping container provides advantages for these smaller treatment systems in terms of transportability, protection of equipment, and desirable reactor size and aspect ratios. The standard high-cube container can be modified to be liquid tight and contain the necessary third-party treatment equipment to accomplish most treatment objectives by varying the configuration of reactors and other equipment in the container, including but not limited to flow equalization basins, activated sludge reactors, clarifiers, tertiary filters, disinfection chambers, post-aeration reactors, solids holding basins, and equipment rooms. However, because the size of a single intermodal container can limit the treatment capacity of any given system, many systems are designed and constructed with consideration of expandable modularity for future growth and expansion.

Unmodified intermodal shipping containers are generally not suitable for use as a liquid holding tank. For one, the walls and joints of these containers are typically not configured to be liquid-tight or to adequately support the hydraulic load of the liquid therein. Furthermore, these containers are typically constructed of light gauge steel with spray-on coatings that if left un-maintained will deteriorate over time until leakage occurs. Such failure will be accelerated in a corrosive wastewater treatment environment. Existing wastewater treatments systems that utilize intermodal shipping containers have focused on modifications to the shipping container to support the significant hydraulic loads and insulate the container from the external environment. However, these existing systems do not completely isolate the reactors from corrosion-prone components, nor do these systems specifically address reactor access, which is major consideration for long term operations and maintenance activities. Wastewater treatment packages require regular maintenance and reactor observation similar to larger facilities, but due to project cost constraints the current state of the art provides limited accommodation for operators and maintenance personnel. Also, limited fall protection is provided by current container modification methods.

What is needed, therefore, is a receptacle for a wastewater treatment system that addresses one or more of the problems in the art. A system for treating wastewater that includes the receptacle disposed in an intermodal shipping container would be further advantageous.

SUMMARY

A scalable, modular receptacle for holding a liquid in one embodiment includes a plurality of frame structures spaced apart in a first direction, each frame structure including a plurality of frame members aligned in a plane normal to the first direction, the frame members including at least two elongate side members spaced apart in a second direction orthogonal to the first direction, the side members extending in a third direction orthogonal to the first and second directions, a side insulation member supported between the side members of adjacent frame structures, the side insulation member defining an inner surface that extends in a plane normal to the second direction and that is coplanar with respective inner surfaces of the side members, and an impermeable liner configured to hold a large volume of the liquid, the liner including a plurality of walls with at least one wall positioned against the inner surface of the side insulation member and the inner surfaces of the side members of the adjacent frame structures such that the at least one wall is supported against a hydraulic load of the liquid.

A system for treating wastewater in one embodiment includes an intermodal shipping container with a container floor and a plurality of container walls extending from the container floor, the container floor and the container walls defining an interior of the intermodal shipping container, and a scalable, modular receptacle positioned on the container floor and spaced apart from the container walls, the receptacle including a plurality of frame structures spaced apart from one another, each frame structure including two elongate side members spaced apart from one another and extending perpendicularly relative to the container floor, a side insulation member supported between the side members of adjacent frame structures, the side insulation member defining an inner surface that is coplanar with respective inner surfaces of the side members, and an impermeable liner configured to hold a large volume of liquid, the liner including a plurality of liner walls with at least one liner wall positioned against the inner surface of the side insulation member and the inner surfaces of the side members of the adjacent frame structures such that the at least one liner wall is supported against a hydraulic load of the liquid.

The receptacle and system disclosed herein address many problems in the current state of the art. The receptacle and system address corrosion related issues by isolating corrosion-sensitive materials from the liquid reactor. The receptacle and system also provide complete access to all liquid holding reactors in a similar way as traditional treatment tanks, while also solving the structural and environmental (external temperature) challenges presented by the containerized form factor when installed at grade in cold climates. The modular nature of the receptacle and system allows for the liquid holding components to be sized appropriately for the design flow and target effluent limits needed, thereby exploiting the advantages of the containerized form while addressing the shortcomings of the relatively weak metal container. The receptacle and system can be deployed to achieve a wide range of tank sizes and depths while utilizing a significant portion of the interior space of the shipping container for reactor volume. To accommodate tank and equipment access, the entire plan area of the reactor is observable from above and an integral handrail post is provided in the frame for built-in fall protection.

The above described features and advantages, as well as others, will become more readily apparent to those of ordinary skill in the art by reference to the following detailed description and accompanying drawings. While it would be desirable to provide scalable, modular receptacle that provides one or more of these or other advantageous features, the teachings disclosed herein extend to those embodiments

DETAILED DESCRIPTION

Figure 1:
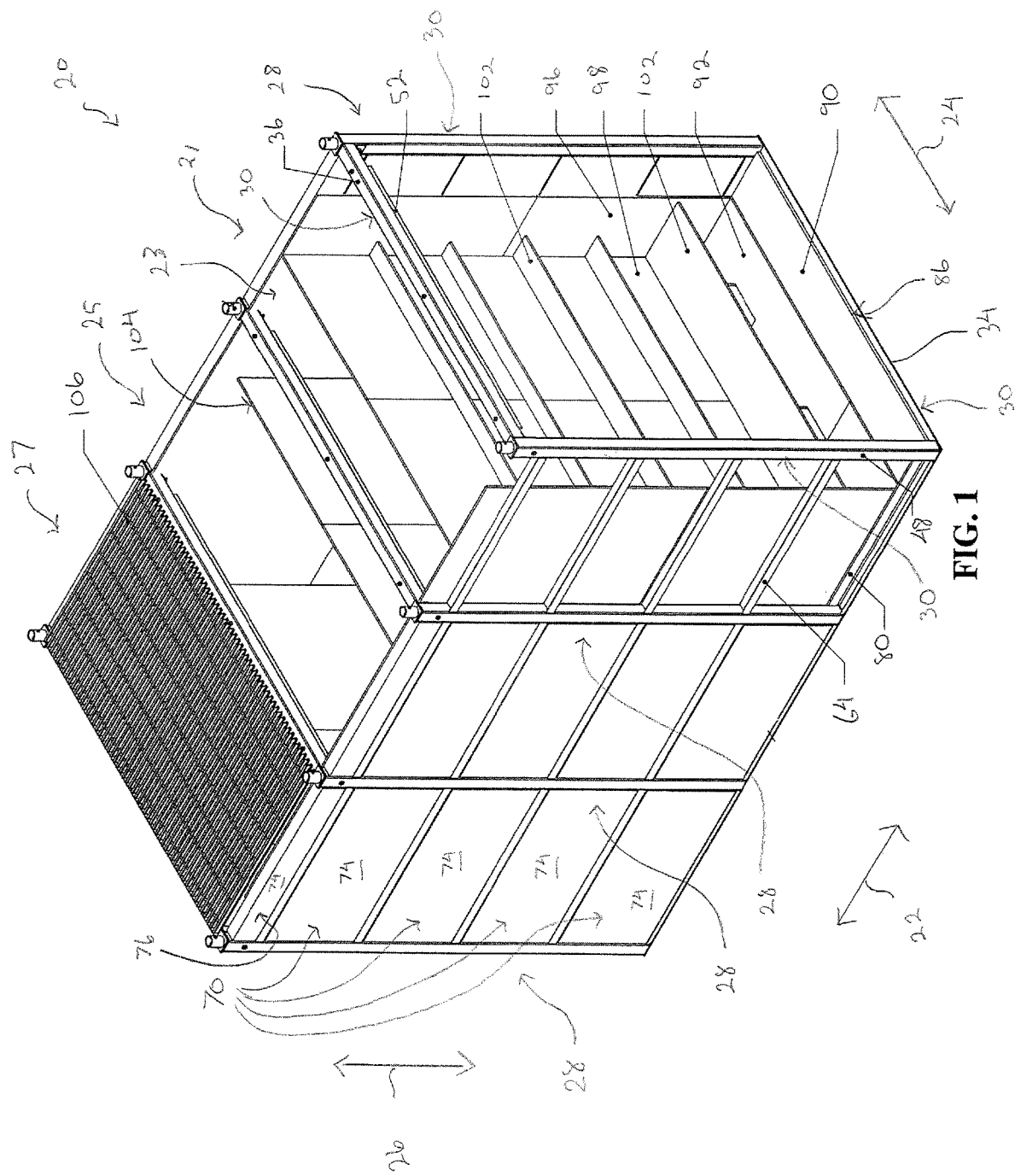
FIG. 1 shows a perspective view of a scalable, modular receptacle configured to hold a large volume of liquid.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 2:
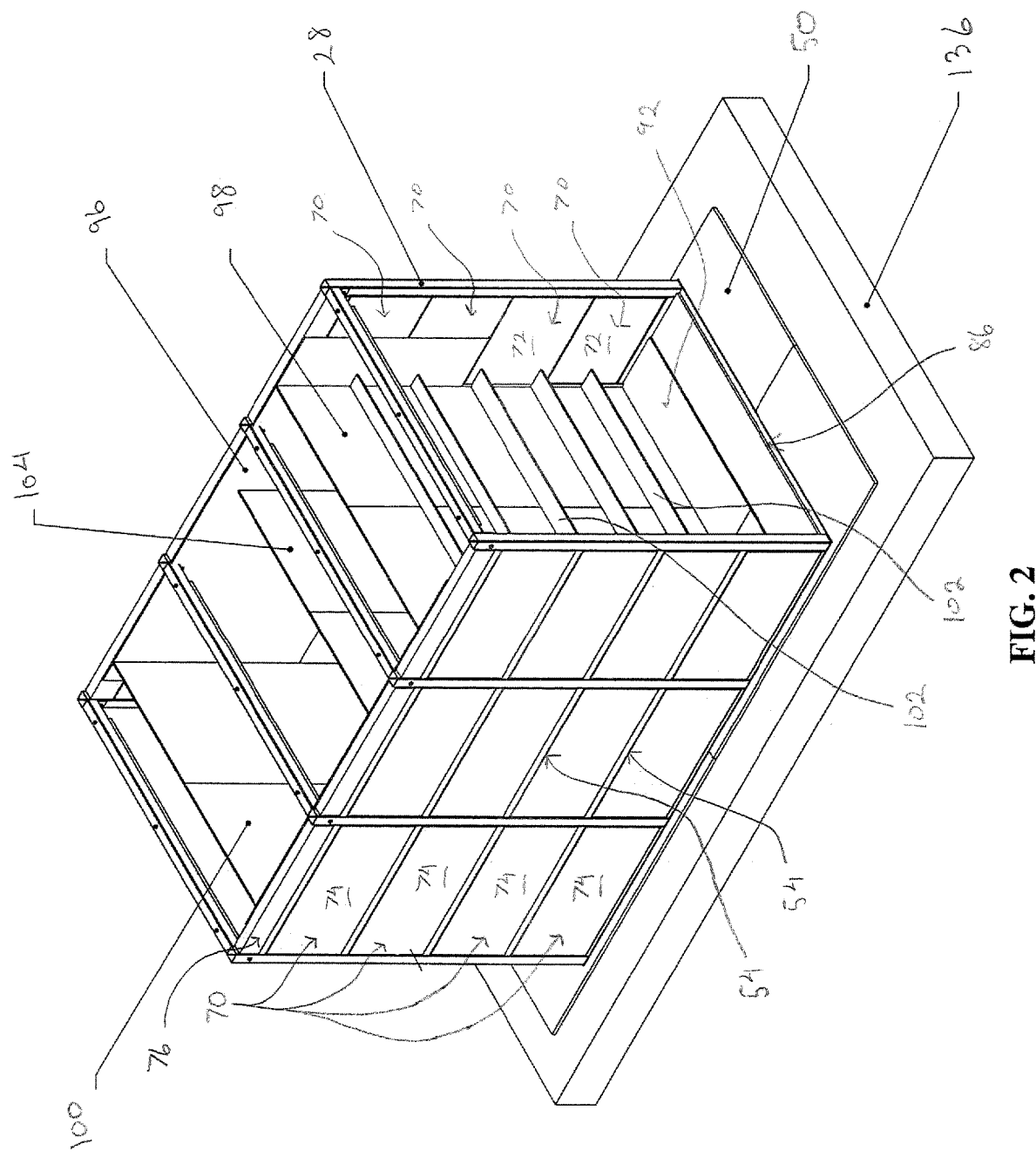
FIG. 2 shows a perspective view of the receptacle of FIG. 1 without an overhead grating panel and with the receptacle positioned on an external support surface.

FIGS. 1 and 2 depict a scalable, modular receptacle 20 for holding a large volume of liquid. Throughout this written specification, various directional terms, spatial terms, geometric terms, and other descriptive terms are used in connection with features of the receptacle 20. As used herein, "large volume of liquid" means a volume of liquid in a range of about 3,000 to 16,000 gallons. The terms "inner", "inwardly", "inner-facing", "inwardly facing", and the like refer to a direction that points or faces towards a liquid held by the receptacle 20. The terms "outer", "outwardly", "outer-facing", "outwardly facing", and the like refer to a direction that points or faces away from a liquid held by the receptacle 20. The terms "upper", "upwardly", and the like refer to a direction that points or a surface that faces opposite the direction in which gravity acts on an object at rest. The terms "lower", "downwardly", and the like refer to a direction that points or a surface that faces in the direction in which gravity acts on an object. The terms "top", "uppermost", and the like refer to the farthest object in a group of objects or the farthest portion of a singular object along a direction opposite the direction in which gravity acts on the group of objects or the singular object, respectively. The terms "bottom", "lower-most", and the like refer to the farthest object in a group of objects or the farthest portion of a singular object along a direction in which gravity acts on the group of objects or the singular object, respectively.

The term "plate-like" when used to describe different elements of the receptacle 20 means that different features of the same element have a relatively uniform thickness that is typically much smaller than other dimensional aspect of those different features of same given element. The term "approximately" used in connection with other terms means that the value following the term "approximately" is the target value, but the value corresponding to the actual physical structure can deviate from the target value by an amount within acceptable manufacturing and/or assembly tolerances in the art.

The directional terms "first direction" 22, "second direction" 24, and "third direction" 26 are also used throughout this written specification in connection with describing the features of the receptacle 20. The first direction 22 is perpendicular to the second direction 24 and the third direction 26 and is sometimes referred to in connection with a "length" of the receptacle 20 or various features of the receptacle 20. The second direction 24 is perpendicular to the first direction 22 and the third direction 26 and is sometimes referred to in connection with a "width" of the receptacle 20 or various features of the receptacle 20. The third direction 26 is perpendicular to the first direction 22 and the second direction 24 and is sometimes referred to in connection with a "height" or "depth" of the receptacle 20 or various features of the receptacle 20.

Figure 3:
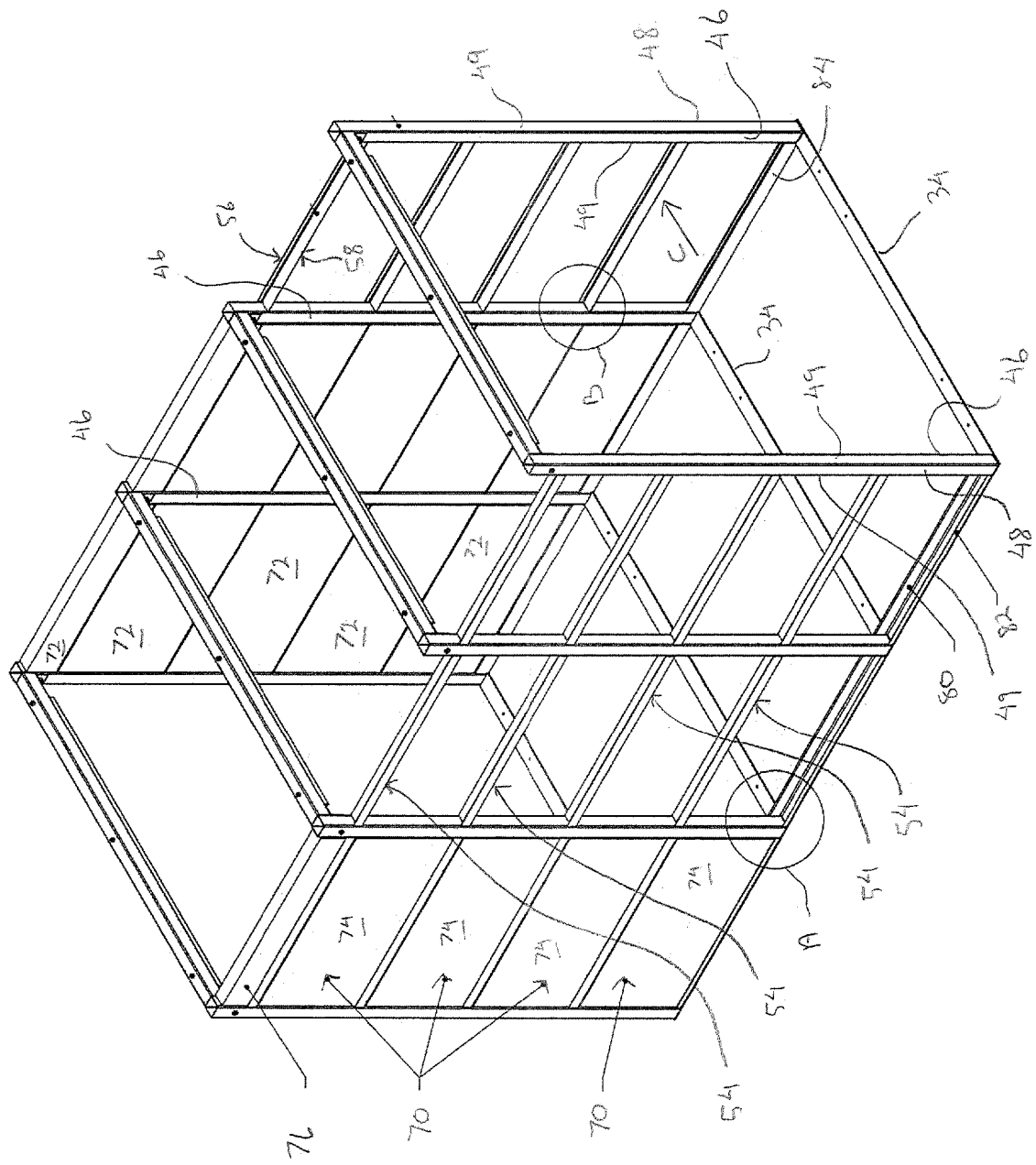
FIG. 3 shows a perspective view of the receptacle of FIG. 1 without a liner and without selected side insulation members in order to better illustrate a frame of the receptacle.
Figure 3A:
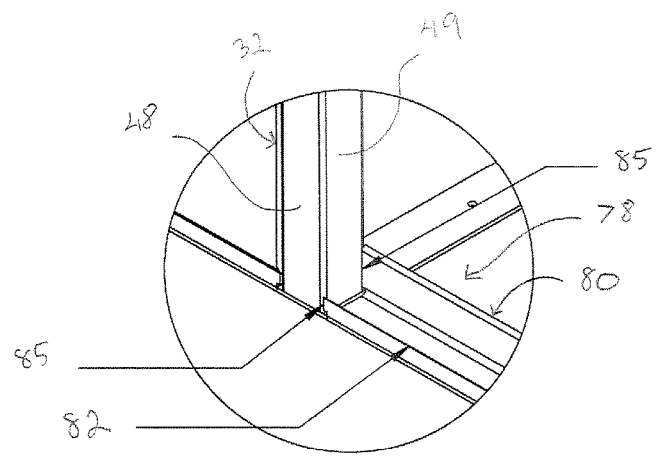
FIG. 3A shows an enlarged detail view of an elongate bottom link member of the receptacle of FIG. 3.

Referring to FIGS. 1-3, the receptacle 20 includes a modular frame portion 21 and a liner 23 that defines a watertight structure configured to hold the liquid. The modular frame portion 21 includes a plurality of frame structures 28 spaced from one another in the first direction 22. The adjacent frame structures 28 in the embodiment shown have a center-to-center spacing of approximately 4 feet from one another in the first direction 22. In different embodiments, the spacing between the adjacent frame structures 28 is greater or lesser than 4 feet. Each frame structure 28 is essentially identical and includes a plurality of elongate frame members 30 aligned substantially in a plane oriented normal to the first direction 22. The phrase "a plurality of frame members aligned substantially in a plane" means that the structure of each frame member 30 defines a center line passing through an approximate geometric center of the frame member 30 in the direction of extent of the frame member 30 and that the respective center lines of the frame members 30 lie on the plane.

Referring to FIGS. 1-4, the frame members 30 of each frame structure 28 include at least two side members 32, a plate-like bottom member 34, and a top member 36. The side members 32 are spaced from one another in the second direction 24 and extend in parallel relationship with respect to one another in the third direction 26. The side members 32 in the embodiment shown extend a distance of 105 inches in the third direction 26 although in different embodiments the side members can extend greater or lesser distances. The side members 32 each have a bottom end 38 at a lower-most region of the side member 32 and a top end 40 at an upper-most region of the side member 32. The side members 32 in the embodiment shown have a square cross section when viewed in a section plane oriented normal to the third direction 26. In one embodiment, the side members 32 are formed from 3×3×⅛ A500 GR. C HSS. In other embodiments, the side members 32 are formed with different dimensions and different materials.

As best viewed in FIG. 3, the cross-sectional shape of each of the side members 32 defines a plurality of surfaces including a respective inner surface 46 and a respective outer surface 48. The inner surfaces 46 of the side members 32 of the same frame structure 28 face one another in the second direction 24. The outer surfaces 48 of the side members 32 of the same frame structure 28 face away from one another in the second direction 24. The plurality of surfaces of each side member 32 also includes opposed side surfaces 49 that on the same side member 32 face away from one another in the first direction 22. The corresponding side members 32 on each respective side of adjacent frame structures 28 have side faces 49 that face one another in the first direction 22 and side faces that face away from one another in the first direction 22.

The bottom member 34 extends in the second direction 24 and is connected to the side members 32 at the respective bottom ends 38 of the side members 32. The bottom member 34 rests on a support surface 50 for the receptacle 20. In some embodiments, the bottom member 34 is secured or otherwise fastened to the support surface 50 via screws or similar fastening methods. The bottom member 34 in the embodiment shown extends a distance of 7 feet and 7¼ inches in the second direction 24 although in different embodiments the bottom member can extend greater or lesser distances. The bottom member 34 is fillet welded 39 to the bottom ends 38 of the side members 32 although other connection methods can be used in other embodiments. In one embodiment, the bottom member 34 is formed from ¼" A36 PL. 3½" WIDE. In other embodiments, the bottom member 34 is formed with different dimensions and materials.

The top member 36 extends in the second direction 24 and is connected to the side members 32 at the respective top ends 40 of the side members 32. The top member 36 can include an attachment structure 52 configured to enable attachment of one or more objects thereto for suspension over the liner 23 and/or penetration into the watertight structure defined by the liner 23. The attachment structure 52 in one embodiment is Unistrut® channel. The top member 36 in the embodiment shown extends a distance of 7 feet and 7¾ inches in the second direction 24 although in different embodiments the top member can extend greater or lesser distances. The top member 36 is fillet welded 41 to angle members 42, which are respectively attached to the side member 32 via respective fasteners 44. In other embodiments, the top member 36 is attached directly or indirectly to the side members 32 via other connection methods. The angle members 42 in the embodiment shown are formed from 3×3×¼ A304 SS ANGLE 2½" LG. W/⁹⁄₁₆" HOLE, although the angle members 42 in different embodiments can have different dimensions and materials. In one embodiment, the top member 36 is formed from 3×3×⅛ A304 SS HSS. In other embodiments, the top member 36 is formed with different dimensions and different materials.

The modular frame portion 21 further includes at least one elongate link member 54 that extends in the first direction 22 and that connects the adjacent frame structures 28 at the side members 32 along each side of the frame structures 28. In other words, the adjacent frame structures 28 are connected by at least two elongate link members 54 with one link member 54 disposed on one side of the adjacent frame structures 28 and the other link member 54 disposed on the other side of the adjacent frame structures 28. The link members 54 in the embodiment shown extend a distance of 45 inches in the first direction 22 although in different embodiments the link members can extend greater or lesser distances.

In some embodiments, the modular frame portion 21 includes a plurality of elongate link members 54 that are spaced apart from one another in the third direction 26 on each side of the adjacent frame structures 28. The spacing between the adjacent link members 54 in some of these embodiments is equal. The spacing in at least one of these embodiments is 2 feet and ¾ inches between all of the adjacent link members 54 on the same side. In other embodiments, the spacing varies between adjacent link members 54 on the same side of the adjacent frame structures 28. The link members 54 are additionally spaced in the third direction 26 from the bottom ends 38 and the top ends 40 of the side members 32.

Figure 3B:
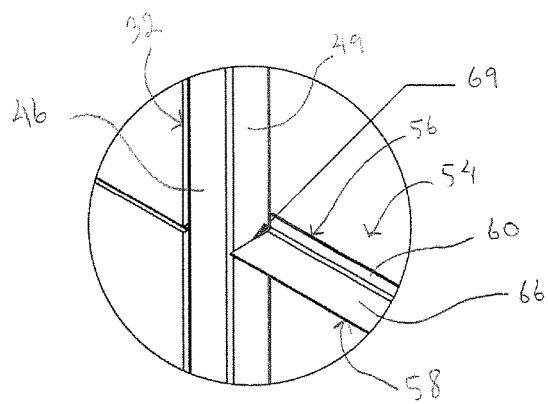
FIG. 3B shows an enlarged detail view of an elongate link member of the receptacle of FIG. 3.
Figure 3C:
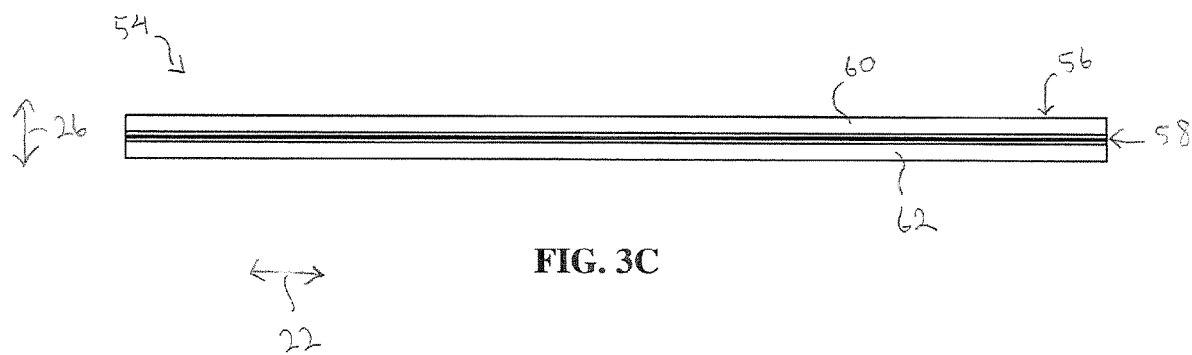
FIG. 3C shows an enlarged auxiliary view of an elongate link member as viewed in the direction of arrow C in FIG. 3.
Figure 4:
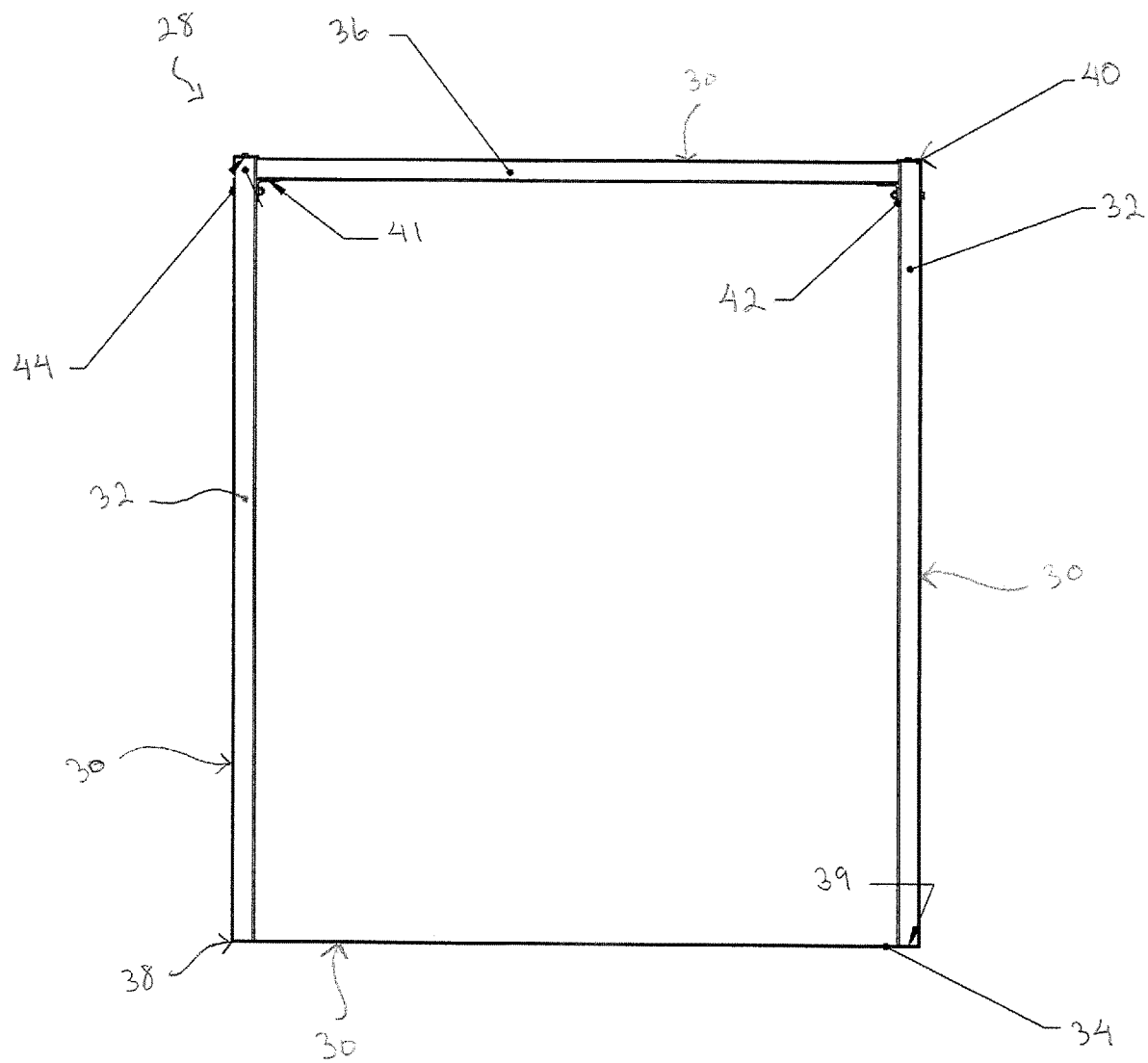
FIG. 4 shows a front plan view of the receptacle of FIG. 3 illustrating one of a plurality of spaced-apart frame structures that form the receptacle.
Figure 5:
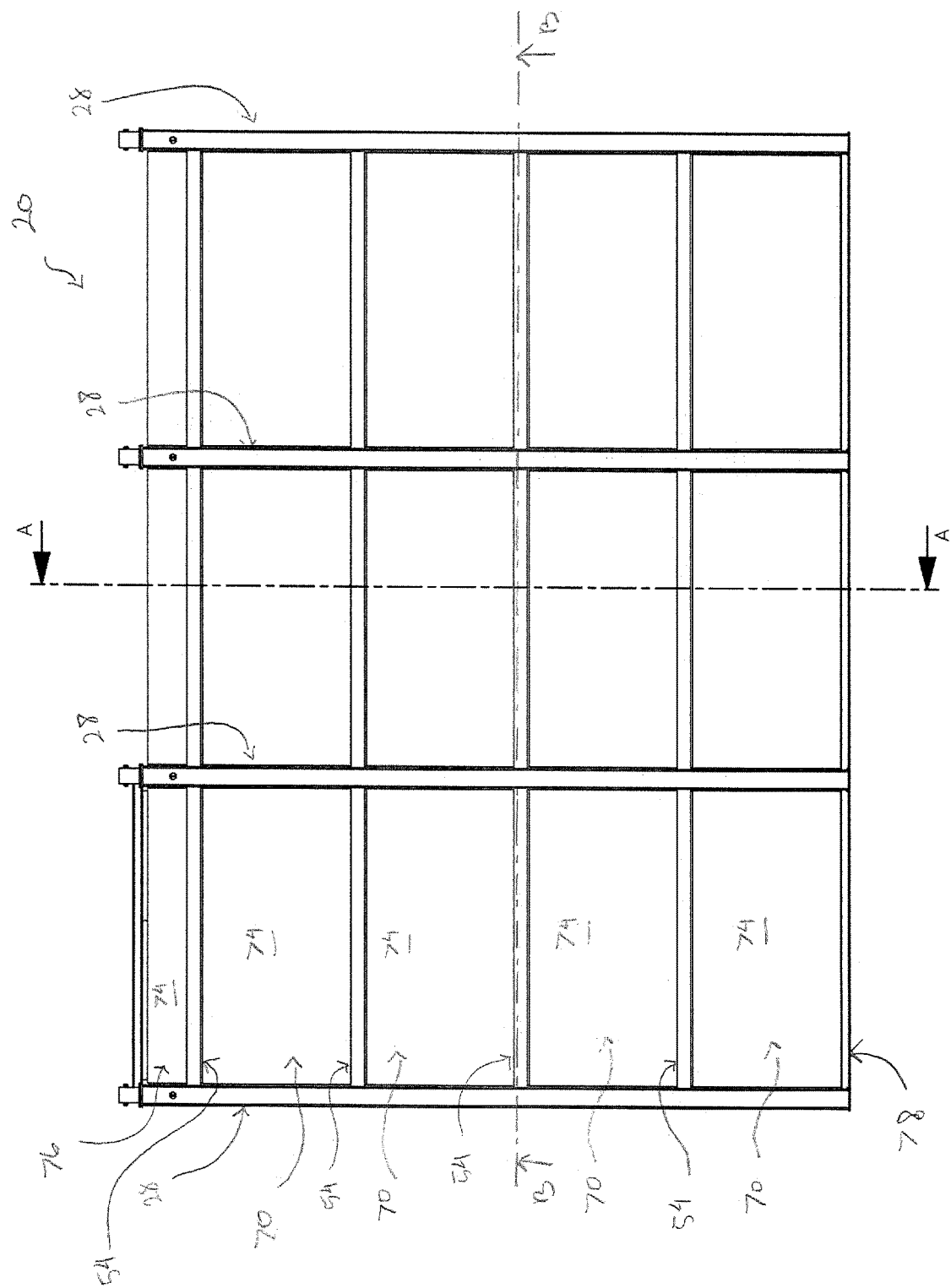
FIG. 5 shows a side plan view of the receptacle of FIG. 0.2.
Figure 7:
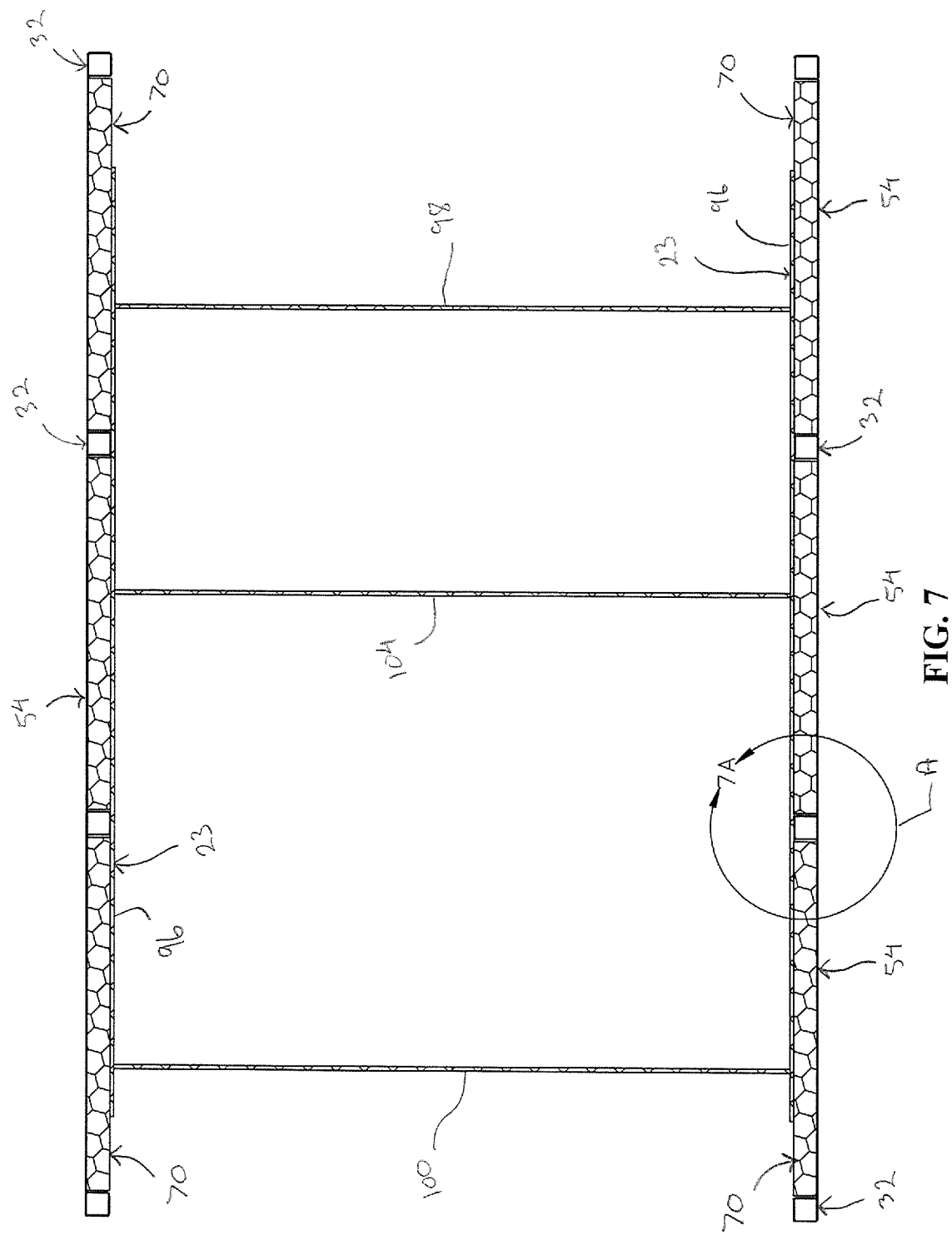
FIG. 7 shows a section cut of the receptacle of FIG. 5 along line B-B.
Figure 7A:
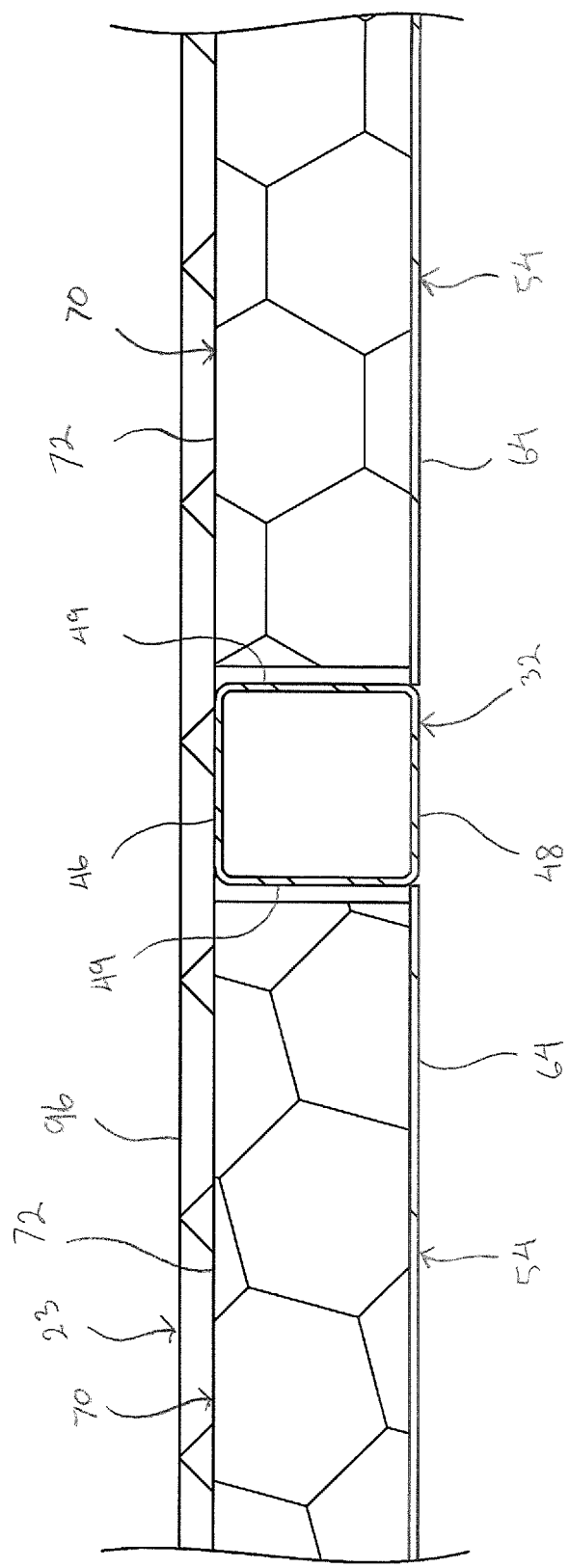
FIG. 7A shows an enlarged detail view of a portion of the receptacle of FIG. 7.
Figure 8:
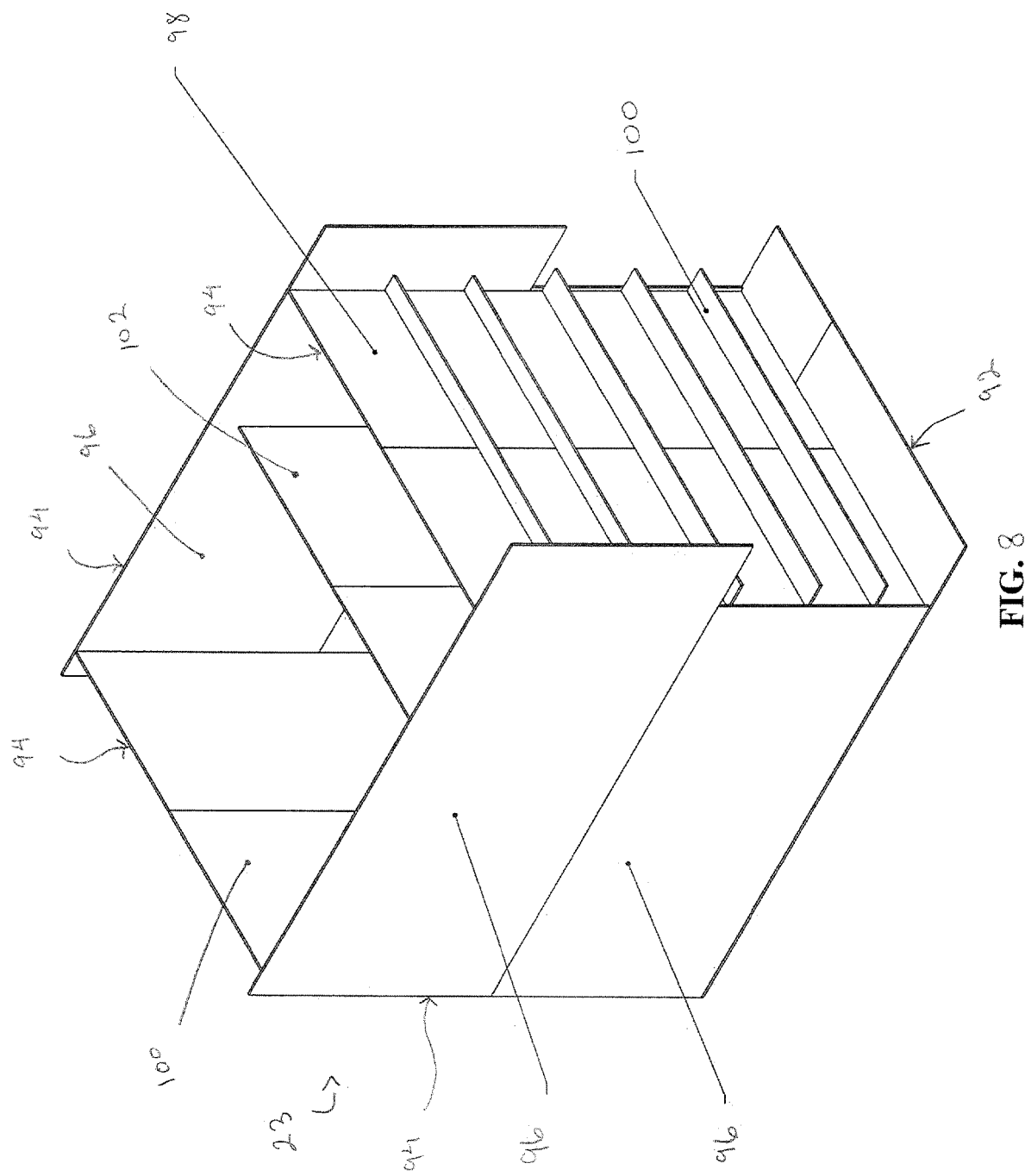
FIG. 8 shows a perspective view of the liner of the receptacle of FIG. 2 without the frame and without the insulation members.

As best shown in FIGS. 3, 3B, and 3C, the link members 54 each include a plate-like first body portion 56 and a plate-like second body portion 58. The first body portion 56 is oriented in a plane normal to the second direction 24, and the second body portion 58 is oriented in a plane normal to the third direction 26. The second body portion 58 extends inwardly from the first body portion 56 and bisects the first body portion 56 such that the link member 54 has a shape in the form of the letter T laid on its side. The first body portion 56 defines an upper inner surface 60 and a lower inner surface 62 separated from the upper inner surface 60 by the second body portion 58. With particular reference to FIG. 7A, the first body portion 56 also defines an outer surface 64 that faces outwardly in the second direction 24. The outer surface 64 of the first body portion 56 of each link member 54 is aligned flush with the respective outer surfaces 48 of the side members 32 of the adjacent frame structures 48 when viewed in the third direction 26. In other words, the outer surfaces 64 of the link members 54 are coplanar with the outer surfaces 48 of the side members 32.

With reference again to FIGS. 3, 3B, and 3C, the second body portion 58 defines an upper surface 66 and a lower surface 68 that faces opposite the upper surface 66 in the third direction 26. The link members 54 in the embodiment shown connect the adjacent frame structures 28 via fillet welds 69 along ends of the first body portion 56 and the second body portion 58 at facing side surfaces 49 of the side members 32. The link members 54 in other embodiments can connect the adjacent frame structures 28 via other fastening methods. The link members 54 in the embodiment shown are formed from MT3×1.85 A36 TEE, although the link members 54 in different embodiments can have different dimensions and materials.

Referring to FIGS. 1-3, 5-7, and 7A, the modular frame portion 21 further includes at least one side insulation member 70 that is supported between the side members 32 of the adjacent frame structures 28 along each side of the frame structures 28. In other words, the modular frame portion 21 includes at least two side insulation members 70 with one side insulation member 70 supported on one side of the adjacent frame structures 28 and the other side insulation member 70 supported on the other side of the adjacent frame structures 28.

In some embodiments, the modular frame portion 21 includes a plurality of side insulation members 70 arranged approximately end to end in the third direction 26 on each side of the adjacent frame structures 28. The side insulation members 70 each define an inner surface 72 that extends in a plane normal to the second direction 24 and an outer surface 74 that faces opposite the inner surface in the second direction 24. With particular reference to FIG. 7A, the inner surface 72 of each of the side insulation members 70 is aligned flush with the respective inner surfaces 46 of the side members 32 when viewed in the third direction 26. In other words, the inner surfaces 72 of the side insulation members 70 are coplanar with the inner surfaces 46 of the side members 32.

Referring again to FIGS. 1-3, 5-7, and 7A, the side insulation members 70 in the embodiment shown are formed from commercially available rigid foam with a predetermined flexural strength so that the side insulation members 70 do not buckle under load between the side members 32 of the adjacent frame structures 28. The side insulation members provide both wall rigidity and insulation for the receptacle 20. In at least one embodiment, the side insulation members 70 are formed from a rigid insulation material, such as 3" O.C. FOAMULAR® 600 RIGID FOAM, with an overall length dimension of 44½ inches in the first direction 22 and an overall height of 24 inches in the third direction 26. In different embodiments, the side insulation members 70 can have different dimensions and materials.

The link members 54 on each side of the adjacent frame structures 28 each support at least one side insulation member 70 via direct contact. Additionally, at least one link member 54 on each side of the adjacent frame structures 28 supports at least two side insulation members 70 via direct contact. More specifically, at least one of the upper inner surface 60 and the lower inner surface 62 of the first body portion 56 of each link member 54 supports the outer surface 74 of the side insulation member 70 in the second direction 24 via direct contact. Similarly, at least one of the upper surface 66 and the lower surface 68 of the second body portion 58 of each link member 54 supports an end of the side insulation member 70 in the third direction 26 via direct contact.

The modular frame portion 21 in some embodiments also includes at least one top side insulation member 76 that is supported between the side members 32 of the adjacent frame structures 28 along each side of the frame structures 28. The top side insulation member 76 is essentially identical to the side insulation member 70 except that the overall height of the top side insulation member 76 is less than the overall height of the side insulation member 70. In the embodiment shown, the overall height of the top side insulation member 76 is approximately 6¾ inches in the third direction 26.

Referring to FIGS. 1, 3, 3A, and 6, the modular frame portion 21 further includes at least one elongate bottom link member 78 that extends in the first direction 22 and that connects the adjacent frame structures 28 in a region proximate to the bottom ends 38 of the side members 32 along each side of the frame structures 28. The bottom link member 78 has an upward-extending inner flange 80 and an upward-extending outer flange 82 that is spaced from the inner flange 80 in the second direction 24. The inner flange 80 extends upwardly in the third direction 26 a greater distance than a distance in which the outer flange 82 extends upwardly. In some embodiments, the inner flange 80 and the outer flange 82 are formed from separate bodies, which are attached to one another to form the bottom link member 78.

In these embodiments, the inner flange 80 is formed from 3×2×¼ A36 ANGLE and the outer flange 82 is formed from 1×1×¼ A36 ANGLE. In other embodiments, the inner flange 80 and the outer flange 82 can have different dimensions and materials. The bottom link members 78 in the embodiment shown connect the adjacent frame structures 28 via fillet welds 85 along opposed ends of the inner flange 80 and the outer flange 82 at facing side surfaces 49 of the side members 32. The bottom link members 78 in other embodiments can connect the adjacent frame structures 28 via other fastening methods.

The inner flange 80 of the bottom link member 78 defines an inner flange surface 84 (FIG. 6) that is oriented in a plane normal to the second direction 24. The inner flange surface 84 of each of the bottom link members 78 is aligned flush with the inner surfaces 46 of the side members 32 of the adjacent frame structures 28 when viewed in the third direction 26.

Figure 6:
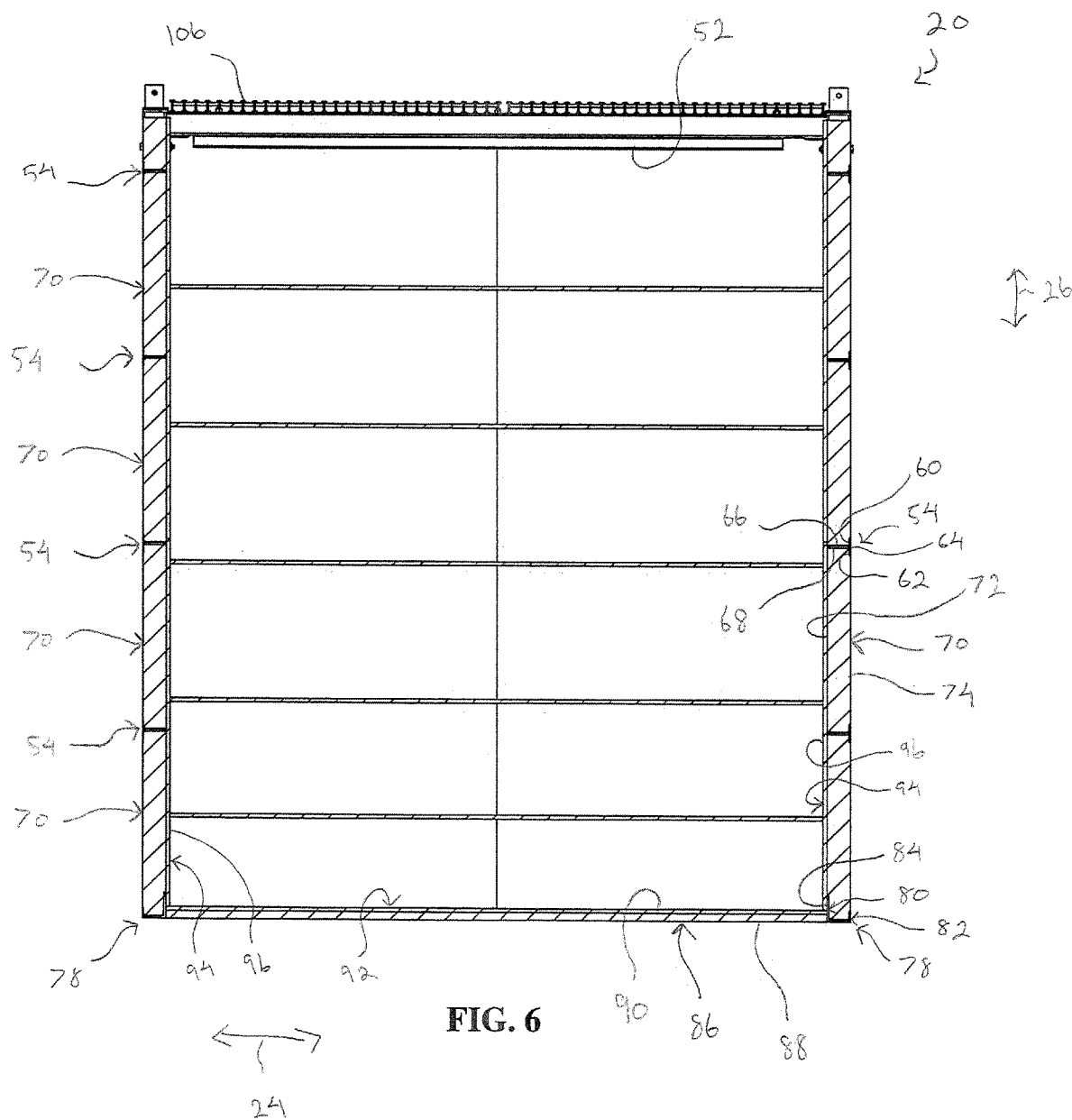
FIG. 6 shows a section view of the receptacle of FIG. 5 along line A-A.

As best shown in FIG. 6, the outer surfaces 74 of the side insulation members 70 are recessed along both the top and bottom ends. These recesses enable the ends of the side insulation members 70 to sit flush against the upper surfaces 66 and the lower surfaces 68 of the link members 54 and permit the non-recessed portions of the outer surfaces 74 to be aligned with the outer surfaces 48 of the side members 32. These recesses also enable the inner surfaces 72 of the side insulation members 70 to be aligned with the inner surfaces 46 of the side members 32. The inner surface 72 and the outer surface 74 of the lower-most side insulation members 70 are recessed along the bottom ends in a different manner than the top ends in order to accommodate the inner flange 80 and the outer flange 82 of the bottom link members 78. The non-recessed portions of the inner surfaces 72 and the outer surfaces 74 of the lower-most side insulation members 70 are aligned with the inner surfaces 46 and the outer surfaces 48 of the side members, respectively. The outer surfaces 74 of the top side insulation members 76 are recessed only along the bottom ends since the top side insulation members 76 are supported by the link members 54 only along the bottom ends.

Referring to FIGS. 1-3 and 6, the receptacle 20 further includes at least one bottom insulation member 86 that is positioned on the support surface 50 of the receptacle 20. The bottom insulation member 86 spans in the first direction 22 between the bottom members 34 of at least two adjacent frame structures 28. The bottom insulation member 86 also spans in the second direction 24 between the inner flange surfaces 84 of the bottom link members 78 and the inner surfaces 46 of the side members 32 on each side of the adjacent frame structures 28. The bottom insulation member 86 defines a lower surface 88 that faces the support surface 50 of the receptacle 20 and an upper surface 90 that faces opposite the lower surface in the third direction 26. The lower surface 88 of the bottom insulation member 86 includes a plurality of recesses that correspond to the bottom members 34. These recesses enable the non-recessed portions of the lower surface 88 to sit flush against the support surface 50, which in turn permits the lower surface 88 and the upper surface 90 of the bottom insulation member 86 to remain parallel with the support surface 50. In some embodiments, the bottom insulation member 86 includes a plurality of smaller-sized bottom insulation members 86 positioned adjacent to one another in order to form the lower surface 88 and the upper surface 90. The bottom insulation member 86 is formed from material similar to the material of the side insulation member 70.

Referring to FIGS. 1, 2, 6 and 8, the liner 23 includes a floor 92 and a plurality of walls 94 that extend generally perpendicularly from the floor 92 in the third direction 26. The floor 92 and the plurality of walls 94 define the watertight structure that is configured to hold the liquid. The floor 92 of the liner 23 rests on the upper surface 90 of the bottom insulation member 86 and spans across the upper surface in both the first direction 22 and the second direction 24. The plurality of walls 94 includes at least two side walls 96 that are respectively positioned in direct contact with the inner surfaces 72 of the side insulation members 70 and the inner surfaces 46 of the side members 32 of the adjacent frame structures 28. The side insulation members 70 are an important feature of the modular frame portion 21 in that the side insulation members 70 keep the liner 23 straight and provide structural resistance to counteract the hydraulic load in the receptacle 20. The side walls 96 each have a bottom portion that is supported against the hydraulic load of the liquid via direct contact with the inner flange surfaces 84 of the bottom link members 78 and the inner surfaces 46 of the side members 32 of the adjacent frame structures 28. The side walls 96 are connected directly to the floor 92 along the bottom portion.

The plurality of walls 94 of the liner 23 further includes a front bulkhead 98 and a rear bulkhead 100 that is spaced from the front bulkhead 98 in the first direction 22. The front bulkhead 98 and the rear bulkhead 100 span between the side walls 96 in the second direction 24 and are connected directly to the side walls 96. The front bulkhead 98 and the rear bulkhead 100 each include a plurality of plate-like reinforcing members 102 that are attached to a respective surface of the front bulkhead 98 and the rear bulkhead 100. The reinforcing members 102 span across the respective surfaces of the front bulkhead 98 and the rear bulkhead 100 and are connected directly to the side walls 96. In the embodiment shown, the reinforcing members 102 are spaced equally from one another in the third direction 26, although in different embodiments the spacing between adjacent reinforcing members 102 varies. In the embodiment shown, the plurality of walls 94 further includes an intermediate bulkhead 104 positioned between and spaced from the front bulkhead 98 and the rear bulkhead 100 in the first direction 22. The bulkheads 98, 100, 104 have respective heights in the third direction 26 that can be identical in some embodiments or that vary from bulkhead to bulkhead in other embodiments.

The different elements of the liner 23, including the floor 92, the side walls 96, the bulkheads 98, 100, 104, and the reinforcing members 102, are preferably formed from the same material. In the embodiment shown, the material of the liner 23 is polypropylene, high-density polyethylene, or a similar polymeric material with comparable structural properties. In the embodiment shown, floor 92, the side walls 96, and the bulkheads 98, 100, 104 are each formed from a plurality of distinct structures or panels that collectively form the specific liner element. For instance, with particular reference to FIG. 8, the floor 92 is formed from at least two distinct panels, the side walls 96 are formed from two distinct panels, and the bulkheads 98, 100, 104 are formed from two distinct panels. The watertight structure formed by the liner 23 is made watertight by seam-welding the various connections among the floor 92, the side walls 96, and the bulkheads 98, 100, 104. The liner 23 in the embodiment shown has a thickness of about ½ inches, although in different embodiments the thickness of the liner 23 can be greater or lesser than ½ inches.

Referring to FIG. 1, the receptacle 20 further includes a grate member 106 that spans between the top members 36 of the adjacent frame structure 28. The grate member 106 forms a grate surface that is configured to support the weight of one or more of an operator and various processing equipment to be used in connection with the receptacle 20. The grate member 106 is configured to be movable so as to provide an opening to the structure defined by the liner 23. In one embodiment, the grate member has a hinge that enable the gate member 106 to be selectively pivoted to provide the opening to the structure defined by the liner 23. In another embodiment, the grate member 106 rests upon the top members 36 such that the grate member 106 can be moved simply by lifting the grate member 106 from the top members 36. The grate member 106 defines a bottom surface upon which a top insulation member 108 is affixed. The top insulation member 108 spans between the top members in order to further insulate the liquid held by the liner 23. In some embodiments, the grate member 106 includes a plurality of grate members 106 disposed across the top members 36 of the frame structures 28 with each grate member including a respective top insulation member 108.

The receptacle 20 in the embodiment shown includes four frame structures 28 spaced apart in the first direction 22. The scalable, modular nature of the receptacle 20 arises because the receptacle 20 in different embodiments can have more or less than four frame structures 28. For example, a first modular frame portion 21 can include two adjacent frame structure 28 and a first group of link members 54, insulation members 70, 76, 86, and bottom link members 78. A second modular frame portion 25 can include a second frame structure 28 spaced from one of the adjacent frame structures 28 of the first modular frame portion 21 along with a second group of link members 54, insulation members 70, 76, 86, and bottom link members 78 associated with the second modular frame portion 25. A receptacle that includes both the first modular frame portion 21 and the second modular frame portion 21 would be longer in the first direction 22 than a receptacle that includes only the first modular frame portion 21.

A third modular frame portion 27 can include a third frame structure 28 spaced from the second frame structure 28 of the second modular frame portion 25 along with a third group of link members 54, insulation members 70, 76, 86, and bottom link members 78 associated with the third modular frame portion 27. A receptacle that includes the first modular frame portion 21, the second modular frame portion 25, and the third modular frame portion 27 would be longer in the first direction 22 than a receptacle that includes only the first modular frame portion 21 and the second modular frame portion 25. Thus, the size of the receptacle 20 is customizable at least in the first direction 22 by selecting an appropriate number of modular frame portions 21, 25, 27 to be placed adjacent to one another. The size of the liner 23 in the first direction 22 is also customizable in that it can overlap some or all of the modular frame portions 21, 25, 27.

Figure 9:
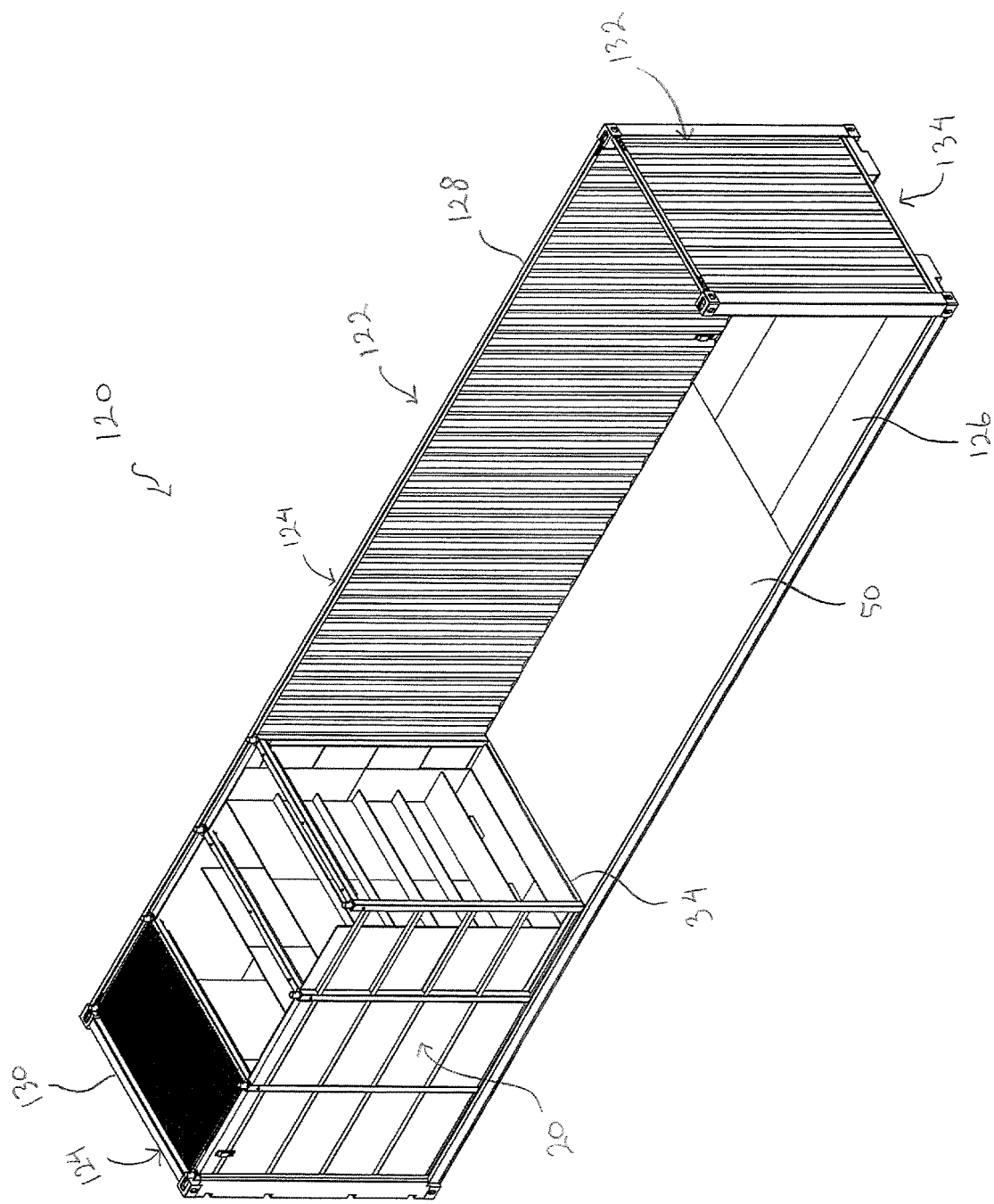
FIG. 9 shows a perspective view of a wastewater treatment system that includes the receptacle of FIG. 1 integrated in an intermodal shipping container.
Figure 10:
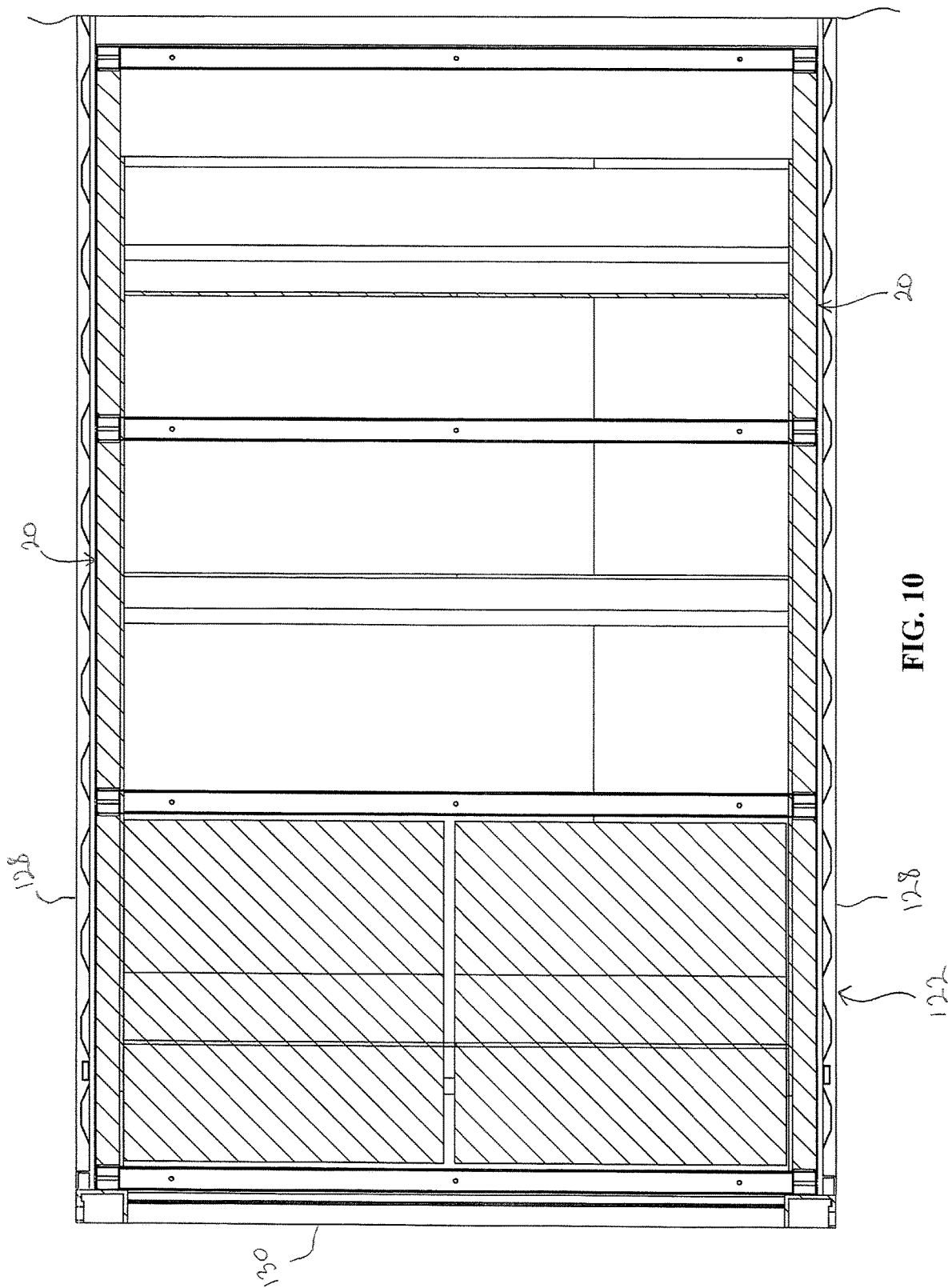
FIG. 10 shows a top view of a portion of the wastewater treatment system of FIG. 9 with a top of the intermodal container removed to shown the spacing between the receptacle and peripheral walls of the intermodal container.

FIGS. 9 and 10 depict a wastewater treatment system 120 that includes an intermodal container 122 and a free-standing, modular receptacle, such as the receptacle 20 of FIGS. 1-8, integrated in the intermodal shipping container 122. The intermodal container 122 is a large standardized shipping container configured to be used across different modes of transport without unloading and reloading the contents therein. The intermodal container 122 is configured as a rectangular, closed box with a plurality of walls 124 that define an interior of the container 122. The plurality of walls 124 includes a bottom or floor 126, two opposed side walls 128 (one side wall not shown for clarity), a rear end wall 130, a front end wall 132 disposed opposite the rear end wall 130, and a top or ceiling (not shown for clarity). The front end wall 132 is formed by a pair of pivotable doors 134 that expose an opening into the interior of the intermodal container 122. The walls 124 of the intermodal container 122 are made of corrugated weathering steel, and a layer of plywood or steel is positioned on the floor 126 within the intermodal container 122. The plywood in the embodiment shown corresponds to the support surface 50.

The intermodal container 122 in the embodiment shown is of standard size having a length of twenty feet or forty feet in the first direction 22, although the container in other embodiments can have different lengths. The intermodal container 122 has a width of 8 feet in the second direction 24 and a height of 8 feet 6 inches in the third direction 26. In another embodiment, the intermodal container 122 is configured as a "High Cube" container with a height of 9 feet 6 inches. In yet further embodiments, the intermodal container 122 can have different widths and heights. The intermodal container 122 is positioned on a reinforced surface 136 (FIG. 2), such as a concrete slab.

The receptacle 20 is positioned within the interior of the intermodal container 122. The receptacle 20 in some embodiments rests on the support surface 50. In other embodiments, one or more bottom members 34 of the frame structures 28 are secured directly to the support surface 50 via fasters or similar means of connection. As best shown in FIG. 10, the receptacle 20 is spaced from the side walls 128, the rear end wall 130, and the doors 134 of the intermodal container 122 such that the receptacle is free-standing. The spacing between the receptacle 20 and the intermodal container 122 is such that the intermodal container 122 provides no lateral support to counteract the hydraulic load on the receptacle 20 from the liquid held therein. The receptacle 20 in at least one embodiment is configured to hold up to 16,000 gallons (or approximately 133,500 pounds) of water, although the receptacle 20 in other embodiments holds different amounts of water or other liquids. The volumetric capacity of the receptacle 20 is adjustable by selecting an appropriate number of modular frame portions 21, 25, 27 to be placed adjacent to one another and by customizing the liner 23 to overlap some or all of the modular frame portions 21, 25, 27.

In some embodiments, further insulation is positioned between the receptacle 20 and the walls 124 of the intermodal container 122. For instance, commercially-available, closed-cell spray foam could be applied to fill the space between the receptacle 20 and the intermodal container 122 in order to increase the R value of the insulation around the liner 23.

The wastewater treatment system further includes various utilities that interact with the watertight structure defined by the liner 23 of the receptacle 20. As an example, diffusers can be suspended from the top members 36 of the receptacle 20 and penetrate into the liquid held by the liner 23. The top members 36 in some embodiments also support pipes, ducts, or other material transport equipment and/or wiring that pass over the liner 23. The top members 36 in some embodiments also support utilities that penetrate through one or more of the bulkheads 98, 100, 104 of the liner 23.

The receptacle 20 can be assembled in the intermodal container 122 in several different ways. One method involves constructing individual sections or portions of the receptacle either off-container as a whole and installed as a subassembly at regular intervals, or inside the container in individual pieces as preferred by the assembler. Another method involves assembling the sides of the receptacle lengthwise inside the intermodal container and then connecting the top members from side to side to complete the receptacle.

The foregoing detailed description of one or more embodiments of the scalable, modular receptacle has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. For instance, under some hydraulic loads, the bulkheads 98, 100, 104 can deflect outwardly by some amount. In one alternative embodiment, one or more of the bulkheads 98, 100, 104 is further reinforced by an elongate center member that extends in the third direction 26 and rests against a surface of the bulkheads 98, 100, 104. In some of these alternative embodiments, the center member is secured to the frame structure 28 closest to the reinforced bulkhead by one or more structural members. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

The invention claimed is:

1. A scalable, modular receptacle for holding a liquid, comprising:
    a plurality of frame structures spaced apart in a first direction, each frame structure including a plurality of frame members aligned in a plane normal to the first direction, the frame members including at least two elongate side members spaced apart in a second direction orthogonal to the first direction, the side members extending in a third direction orthogonal to the first and second directions;
    a side insulation member supported between the side members of adjacent frame structures, the side insulation member defining an inner surface that extends in a plane normal to the second direction and that is coplanar with respective inner surfaces of the side members; and
    an impermeable liner configured to hold a large volume of the liquid, the liner including a plurality of walls with at least one wall positioned against the inner surface of the side insulation member and the inner surfaces of the side members of the adjacent frame structures such that the at least one wall is supported against a hydraulic load of the liquid; and
    an elongate link member that extends in the first direction and that connects the adjacent frame structures at the side members, the side insulation member supported between the side members of the adjacent frame structures by the link member,
    wherein the link member includes a plurality of link members spaced apart from one another in the third direction, wherein the side insulation member includes a plurality of side insulation members, and wherein each link member supports at least one side insulation member via direct contact.

2. The receptacle of claim 1, wherein at least one link member of the plurality of link members supports at least two side insulation members via direct contact.

3. The receptacle of claim 1, wherein the plurality of link members are (i) spaced from opposed ends of the side members in the third direction and (ii) equally spaced apart from one another in the third direction.

4. The receptacle of claim 1, further comprising an elongate bottom link member that extends in the first direction and that connects the adjacent frame structures at bottom ends of the side members, the bottom link member having an upward-extending inner flange and an upward-extending outer flange spaced from the inner flange in the second direction.

5. The receptacle of claim 4, wherein the inner flange of the bottom link member defines an inner flange surface that is coplanar with the inner surfaces of the side members, and wherein a bottom portion of the at least one wall of the liner is supported in the second direction via direct contact with the inner flange surface of the bottom link member and the inner surfaces of the side members.

6. The receptacle of claim 1, wherein:
the frame members of each frame structure further include a plate-like bottom member attached to bottom ends of the side members, the bottom member in direct contact with a support surface for the receptacle,
a bottom insulation member spans between the bottom members of adjacent frame structures and rests on the bottom members and the support surface, the bottom insulation member defining an upper surface, and
wherein a floor of the liner is supported by the bottom insulation member.

7. The receptacle of claim 1, wherein the frame members of each frame structure further include a top member attached to top ends of the side members, the top member including an attachment structure configured to attach at least one object thereto for one or more of suspension over the liner and penetration into the liner.

8. The receptacle of claim 7, further comprising a grate member spanning between the top members of adjacent frame structures, the grate member configured to be movable relative to the top members so as to provide an opening into the liner.

9. The receptacle of claim 8, wherein a top insulation member is affixed to a bottom surface of the grate member, the top insulation member spanning between the top members.

10. The receptacle of claim 1, wherein the at least one wall of the liner includes two side walls spaced apart in the second direction, and wherein the plurality of walls of the liner further includes at least two bulkheads that (i) are spaced apart in the first direction, (ii) extend perpendicularly from a floor of the liner, and (iii) span between the two side walls of the liner, each bulkhead including a plurality of plate-like reinforcing members that span between the two side walls and are attached to the bulkhead and the two side walls.

11. A scalable, modular receptacle for holding a liquid comprising:
a plurality of frame structures spaced apart in a first direction, each frame structure including a plurality of frame members aligned in a plane normal to the first direction, the frame members including at least two elongate side members spaced apart in a second direction orthogonal to the first direction, the side members extending in a third direction orthogonal to the first and second directions;
a side insulation member supported between the side members of adjacent frame structures, the side insulation member defining an inner surface that extends in a plane normal to the second direction and that is coplanar with respective inner surfaces of the side members;
an impermeable liner configured to hold a large volume of the liquid, the liner including a plurality of walls with at least one wall positioned against the inner surface of the side insulation member and the inner surfaces of the side members of the adjacent frame structures such that the at least one wall is supported against a hydraulic load of the liquid; and
an elongate link member that extends in the first direction and that connects the adjacent frame structures at the side members, the side insulation member supported between the side members of the adjacent frame structures by the link member,
wherein the link member has (i) a plate-like first body portion oriented in a plane normal to the second direction and (ii) a plate-like second body portion oriented in a plane normal to the third direction, the second body portion extending inwardly from the first body portion and bisecting the first body portion such that the link member has a shape in the form of the letter T on its side.

12. The receptacle of claim 11, wherein the first body portion of the link member defines an upper inner surface and a lower inner surface separated from the upper inner surface by the second body portion, wherein the side insulation member has an outer surface facing opposite the inner surface, and wherein at least one of the upper inner surface and the lower inner surface supports the outer surface of the side insulation member in the second direction via direct contact.

13. The receptacle of claim 11, wherein the first body portion of the link member defines an outer surface that is coplanar with respective outer surfaces of the side members of the adjacent frame structures.

14. The receptacle of claim 11, wherein the second body portion defines an upper surface and a lower surface facing opposite the upper surface, at least one of the upper surface and the lower surface supporting the side insulation member in the third direction via direct contact.

15. A container system for treating wastewater, comprising:
an intermodal shipping container with a container floor and a plurality of container walls extending from the container floor, the container floor and the container walls defining an interior of the intermodal shipping container; and
a scalable, modular receptacle positioned on the container floor and spaced apart from the container walls, the receptacle including:
a plurality of frame structures spaced apart in a first direction, each frame structure including a plurality of frame members aligned in a plane normal to the first direction, the frame members including at least two elongate side members spaced apart in a second direction orthogonal to the first direction, the side members extending perpendicularly relative to the container floor in a third direction orthogonal to the first and second directions,
a side insulation member supported between the side members of adjacent frame structures, the side insulation member defining an inner surface that extends in a plane normal to the second direction and that is coplanar with respective inner surfaces of the side members, an impermeable liner configured to hold a large volume of liquid, the liner including a plurality of liner walls with at least one liner wall positioned against the inner surface of the side insulation member and the inner surfaces of the side members of the adjacent frame structures such that the at least one liner wall is supported against a hydraulic load of the liquid, and an elongate link member that extends in the first direction and that connects the adjacent frame structures at the side members, the side insulation member supported between the side members of the adjacent frame structures by the link member, wherein the link member includes a plurality of link members spaced apart from one another in the third direction, wherein the side insulation member includes a plurality of side insulation members, and wherein each link member supports at least one side insulation member via direct contact.

16. The container system of claim 15, wherein:

the receptacle includes a first modular frame portion with two adjacent frame structures and a first group of side insulation members supported between the two adjacent frame structures, the receptacle includes a second modular frame portion with (i) a second frame structure spaced apart from one of the two adjacent frame structures and (ii) a second group of side insulation members supported between the second frame structure and the one of the two adjacent frame structures, and wherein the at least one liner wall overlaps at least a portion of the first modular frame portion and the second modular frame portion.

17. The container system of claim 16, wherein the receptacle includes N further modular frame portions where N is an integer greater than 1, each further modular frame portion including (i) a further frame structure spaced apart from an outermost frame structure and (ii) a further group of side insulation members supported between the further frame structure and the outermost frame structure.

* * * * *